Dec. 24, 1946.    H. C. SAGE    2,413,072

PICK-UP REEL FOR HARVESTERS

Filed March 12, 1945

INVENTOR

H. C. Sage

BY

ATTORNEYS

Patented Dec. 24, 1946

2,413,072

UNITED STATES PATENT OFFICE 2,413,072

PICKUP REEL FOR HARVESTERS

Harry C. Sage, Stockton, Calif., assignor to Thompson Sage, Inc., Stockton, Calif., a corporation of California Application March 12, 1945, Serial No. 582,256

8 Claims. (Cl. 56—222)

This invention has for an object the provision of an improved pick-up reel for harvesters, and in particular a reel which is especially adapted to pick up crops which grow close to the ground, or which are down on account of wind or rain; crops as picked up by the reel being fed across a cutter bar assembly and thence onto a carry-off draper as is conventional.

Another object of this invention is to provide a pick-up reel, as above, which includes a multiple-row tine assembly so arranged that crops are engaged a substantially greater distance ahead of the cutter bar assembly, and in a lower horizontal plane, than is possible with reels heretofore known.

A further object of the invention is to provide a pick-up reel which comprises a reel structure having a plurality of longitudinal, circumferentially spaced, turnably mounted rods, a tine assembly mounted in connection with each rod and including a leading and a trailing row of projecting tines, and control mechanism operative upon rotation of the reel to relatively turn said rods so as to maintain said rows of tines in a dependent position at the bottom portion of the reel; the tines of each trailing row being of greater length than the tines of the corresponding leading row whereby the trailing row of tines engages the crop at a point ahead of and below the point of engagement by said leading row of tines.

An additional object of the invention is to provide a pick-up reel, as in the preceding paragraph, in which the trailing rows of relatively longer tines are mounted so that with rotation of the reel and controlled turning of the rods, said tines sweep in clearance relation to the cutter bar assembly, as do the shorter tines of the leading rows.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views.

Figure 1:
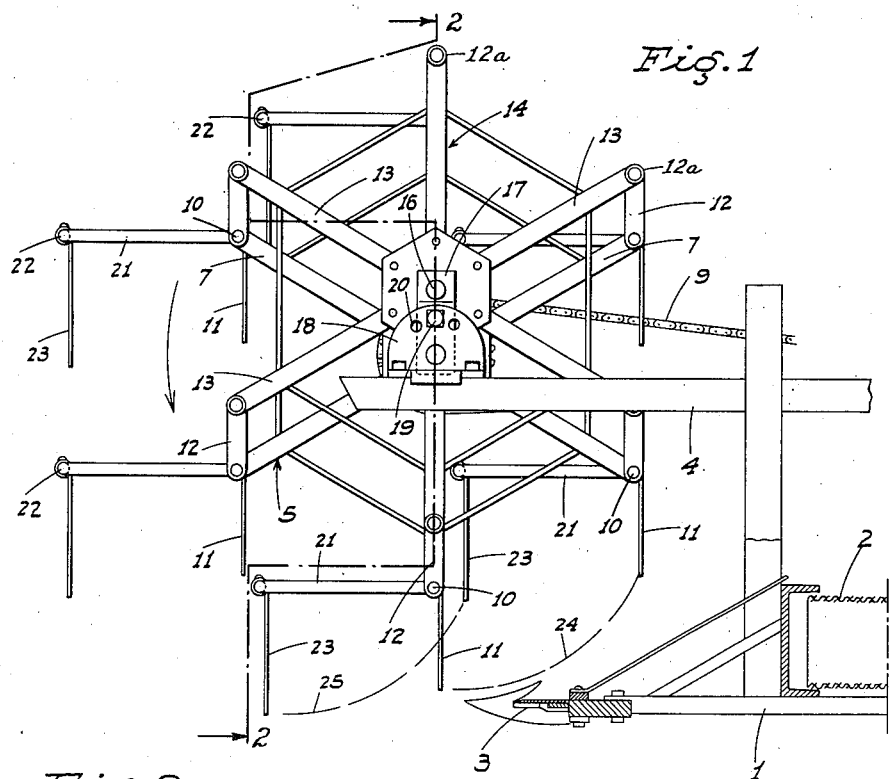
Figure 1 is an end elevation of the pick-up reel embodying the present invention.
Figure 2:
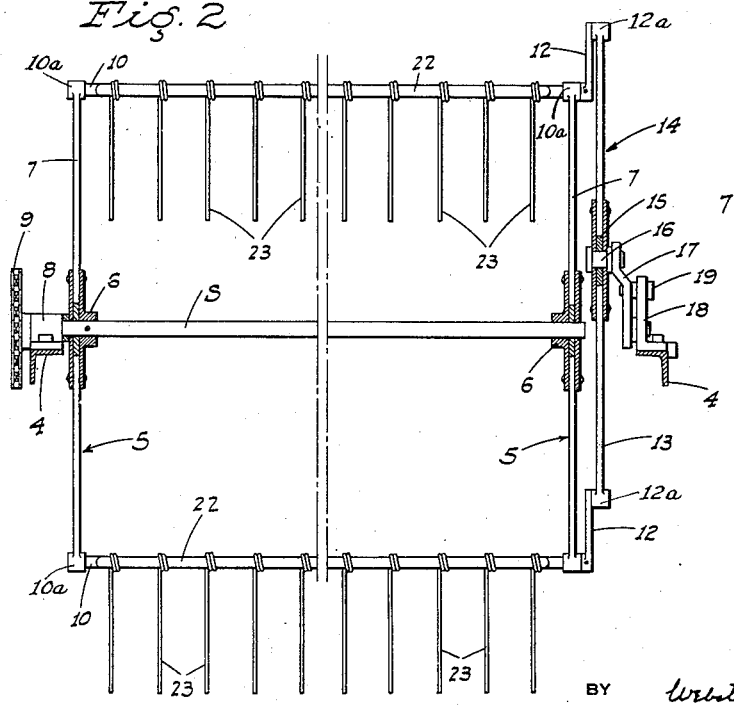
Figure 2 is a transverse sectional elevation of the reel, foreshortened, taken on a line 2—2 of Fig. 1.
Figure 3:
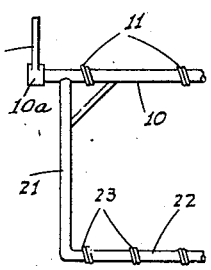
Figure 3 is a fragmentary plan view of one of the multiple-row tine assemblies.

Referring now more particularly to the characters of reference on the drawing, the reel is shown mounted in connection with a header assembly which includes a frame shown in part at 1, and which frame supports a draper unit 2, and a cutter bar assembly 3 in advance thereof and in the usual relationship. The frame 1 includes transversely spaced, forwardly projecting beams 4 between which the reel is journaled for rotation in cooperation with the cutter bar assembly 3 and draper unit 2.

The reel in which the present invention is embodied comprises a pair of end spiders, indicated generally at 5, and which end spiders each include a hub 6 from which a plurality of fixed arms 7 radiate, corresponding arms at opposite ends of the reel being in alinement. The hubs 6 are fixed on a transverse horizontal shaft S journaled at one end, as at 8, to the adjacent reel-supporting beam 4. The shaft S projects outwardly beyond the journal 8 and is there connected with a power drive, indicated generally at 9, said power drive being operative to rotate the reel in the direction of the arrow in Fig. 1. At the end of the reel opposite the journal 8, said reel is supported by means of a control spider assembly, hereinafter described in detail.

Turnably mounted rods 10 are journaled in connection with and extend between the outer ends of corresponding arms 7 as at 10a, and each of said rods 10 supports a depending row of spring steel crop pick-up tines 11.

At the end of the reel opposite the journal 8 the rods 10 are each provided with a fixed crank 12, and said cranks are turnably secured as at 12a to the outer ends of corresponding radial arms 13 of an offset or eccentric control spider, indicated generally at 14, and which control spider includes a hub 15 from which the arms 13 fixedly radiate. The axis of hub 15 is offset relative to the axis of shaft S a distance equal to the throw of cranks 12.

The control spider 14 is rotatably supported by an eccentric trunnion 16 which projects from a normally fixed but vertically mounted adjustable bracket 17 secured in connection with an upstanding plate 18 on the adjacent supporting beam 4.

With the above control-spider arrangement it will be seen that upon rotation of the reel by the drive 9, the rods 10 will be relatively turned so as to maintain the rows of tines 11 in a dependent position at all times; the exact dependent position of said tines being regulated by adjustment of the bracket 17. Such adjustment of the bracket 17 is accomplished by changing the position of a connecting bolt 19 in the plate 18, the latter having a series of bolt receiving holes 20 therein for this purpose.

The above reel structure and the control mechanism therefor is substantially conventional; the present invention comprising the following structural additions thereto:

Adjacent opposite ends each of the rods 10 is provided with a fixed, radial support 21, said supports extending forwardly relative to the direction of travel of the implement and being in alinement transversely thereof. Other rods 22 extend between and are fixed in connection with the outer ends of the radial supports 21, and rows of spring steel tines 23 are secured on and depend from the rods 22 in parallel relationship to the tines 11. However, the tines 23 are of substantially greater length than the tines 11.

When the reel is in operation the rows of tines 11, which are the leading rows, sweep relatively close to the cutter bar assembly 3 on the line indicated at 24, but as such tines 11 traverse an arcuate path about an axis almost directly above said cutter bar assembly, said tines cannot engage with crops any material distance ahead of said cutter bar assembly or below the longitudinal plane thereof. To overcome this difficulty and to provide a more effective pick-up, the rows of tines 23, mounted as described, are employed, and which may be termed the trailing rows of tines. As previously described, the tines 23 are materially longer than the tines 11 whereby with rotation of the reel said tines 23 not only engage the crop a substantially greater distance ahead of the cutter bar assembly, but also in a horizontal plane slightly below said cutter bar assembly. As a consequence, the pick-up action of the reel is materially improved, so that down and badly entangled crops or very low growing crops can be effectively picked up and fed to the cutter bar assembly 3. The use of the longer tines 23 in the described relationship in the reel, and without such tines interfering with or engaging the cutter bar assembly, is possible for the reason that said tines traverse an arcuate path, the line of which is indicated at 25, a considerable distance ahead of the arcuate path of tines 11. As evidenced by the line 25 the tines 23, even though relatively long, sweep clear of the cutter bar assembly 3.

From the foregoing description it will be readily seen that there has been produced a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel.

2. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; the tines of the trailing rows being of greater length than the tines of said leading rows.

3. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; both the leading and trailing rows of tines sweeping in arcuate paths at the bottom portion of the reel, the axis of the arc of travel of the trailing rows lying forwardly of the axis of the arc of travel of the leading rows.

4. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; both the leading and trailing rows of tines sweeping in arcuate paths at the bottom portion of the reel, the axis of the arc of travel of the trailing rows lying forwardly of the axis of the arc of travel of the leading rows, the tines of the trailing rows being of greater length than the tines of the leading rows.

5. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; each tine assembly including one row of tines projecting from the corresponding rod and comprising the leading row, supports fixed on and projecting out from said rod, another rod mounted in connection with and extending between the ends of said supports, and another row of tines projecting from said other rod in the same direction as said one row of tines and comprising the trailing row.

6. A reel as in claim 5 in which said supports project radially from said corresponding rod, and forwardly relative to the direction of travel of the implement.

7. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; each tine assembly including one row of tines projecting from the corresponding rod and comprising the leading row, supports fixed on and projecting out from said rod, another rod mounted in connection with and extending between the ends of said supports, and another row of tines projecting from said other rod in the same direction as said one row of tines and comprising the trailing row; the tines of the trailing row being of greater length than the tines of the leading row.

8. A pick-up reel comprising a reel structure having a plurality of circumferentially spaced, turnably supported rods, a tine assembly mounted in connection with each rod, each tine assembly including a leading and a trailing row of projecting tines, and control mechanism operative upon rotation of the reel to relatively turn the rods so as to maintain the rows of tines dependent at the bottom portion of the reel; the tines of the respective rows being substantially parallel, and the tines of the trailing rows being longer than the tines of the leading rows.

HARRY C. SAGE.